United States Patent [19]

Endoh

[11] Patent Number: 5,170,388
[45] Date of Patent: Dec. 8, 1992

[54] IMAGE/AUDIO INFORMATION RECORDING/REPRODUCTION APPARATUS WITH BUILT-IN SEMICONDUCTOR MEMORY

[75] Inventor: Naoki Endoh, Yokohama, Japan

[73] Assignee: Kabushiki Kaisha Toshiba, Kawasaki, Japan

[21] Appl. No.: 557,094

[22] Filed: Jul. 25, 1990

[30] Foreign Application Priority Data

Jul. 27, 1989 [JP] Japan .................................. 1-192692
Feb. 21, 1990 [JP] Japan .................................. 2-38264

[51] Int. Cl.⁵ .......................... G11B 31/00; H04N 5/76
[52] U.S. Cl. .................................. 369/70; 358/341; 369/14; 369/47; 360/27; 360/33.1
[58] Field of Search ...................... 360/8–10.3, 360/14.1–14.3, 19.1, 33.1, 27, 79; 369/47, 48, 69, 70, 14; 358/341, 343, 143

[56] References Cited

U.S. PATENT DOCUMENTS 4,924,303  5/1990  Brandon et al. .................... 358/143
5,006,939  4/1991  Cawley ............................... 358/341

OTHER PUBLICATIONS

IEEE Transactions on Broadcasting, vol. BC-33, No. 4, Dec. 1987, Y. Hashimoto et al, An Experimental HDTV Digital VTR with a Bit Rate of 1.188 Gbps.
SMPTE Journal, vol. 96, No. 12, Dec. 1987, James H. Wilkinson, A Review of the Signal Format Specification for the 4:2:2 Component Digital VTR.

Primary Examiner—Jerry Smith
Assistant Examiner—Steven R. Garland
Attorney, Agent, or Firm—Oblon, Spivak, McClelland, Maier & Neustadt

[57] ABSTRACT

An image/audio information recording/reproduction apparatus has a first recording device for receiving a first electrical signal representing image information and recording the image information on a dynamic recording medium of a given type, a static recording medium of a given type for storing a second electrical signal digitally representing audio information accompanying the image information, and a second recording device which is electrically connected to the static recording medium. The second recording device determines a memory address in the static recording medium of audio information accompanying the image information in a manner corresponding to a recording position of the image information on the dynamic recording medium, and records the audio information in the static recording medium in accordance with the determined memory address. The static recording medium includes a non-volatile semiconductor memory, such as an electrically erasable programmable read only memory.

18 Claims, 4 Drawing Sheets

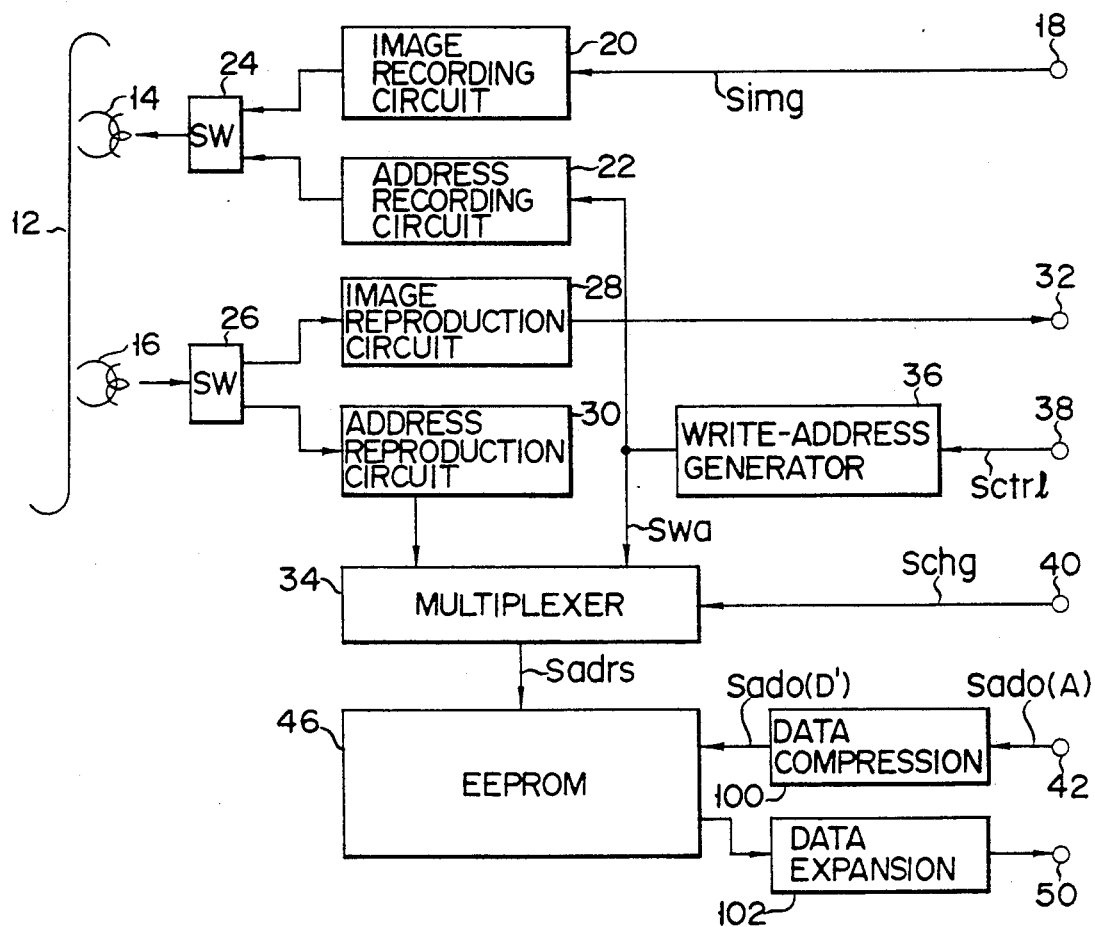
F I G. 3

IMAGE/AUDIO INFORMATION RECORDING/REPRODUCTION APPARATUS WITH BUILT-IN SEMICONDUCTOR MEMORY

BACKGROUND OF THE INVENTION

1. Field of the Invention

The present invention relates to information recording apparatuses, and, more particularly, to an image/audio information recording/reproduction apparatus for recording an image signal and audio signals accompanying the former signal.

2. Description of the Related Art

Apparatuses which record an image signal and audio signals, such as a sound effect, voice and music, accompanying the former signal, on the same recording medium and allows reproduction of recorded information as needed, are popular for business use as well as home use. Those apparatuses may be classified into video tape recorders (VTRs) which use a tape-shaped recording medium, and video disk apparatuses using a disk-shaped one.

Typical VTRs are video cassette recorders (VCRs) using a magnetic cassette tape wherein electrical image and audio information signals are converted by a signal converting unit into magnetic analog or digital information signals, which are magnetically recorded onto a running tape by a magnetic head.

Typical video disk apparatuses are optical disk apparatuses which employ an optical data recording system using a laser beam. In the optical disk apparatuses, electrical image and audio information signals undergo analog-to-digital conversion, and the resultant digital signals are then subjected to optical conversion in a converting section of a laser head or the like to produce a laser beam, which is so modulated as to reflect the optical information signals. This laser beam is "written" on a rotating optical disk. Another type of disk recording apparatuses are also known which employ a "static capacitance data recording" system.

It should be noted that, for both VTRs and video disk apparatuses, information writing is based on the relative movement between the data writing unit an recording medium. In this sense, these prior art information recording apparatuses may be called "dynamic" information recording apparatuses.

For existing dynamic information recording apparatuses including the aforementioned VTRs and video disk apparatuses, there has been a strong demand for improvement of the quality of recorded and reproduced audio signals in order to meet the recent prominent enhancement of image quality. To fulfill higher audio quality, it is popular to employ a digital recording system for recording/reproducing audio signals. Actually, VTRs and video disk apparatuses according to the digital recording system have already been made into practice.

The conventional dynamic information recording/reproduction apparatuses are suffering their low dynamic reliability as well as complication of the circuit structure. The first shortcoming, low dynamic reliability, is originated mainly from deterioration of a disk-shaped recording medium or occurrence of defects thereon; with a defect present on a recording medium for "storing" information, high-quality reproduction signals cannot be expected even if high-quality digital audio signals are properly recorded on the recording medium. On the other hand, the second shortcoming or the complicated circuit structure is originated mainly from additional provision of an error correcting circuit and an error compensating circuit which serve to compensate for the aforementioned deterioration of signal reproduction at the time of executing the analog-to-digital conversion. Building such additional circuitry in the apparatus undesirably increases the circuit scale of the apparatus, raises the manufacturing cost and hinders making the apparatus compact. Simplifying the additional circuitry, however, would certainly reduce the dynamic reliability.

SUMMARY OF THE INVENTION

It is therefore an object of the present invention to provide a new and improved information recording/reproduction technique capable of recording/reproducing high-quality information with high reliability using a smallest scale circuit structure.

It is another object of the present invention to provide a new and improved image/audio information recording/reproduction apparatus capable of recording/reproducing high-quality information with high reliability even with a smallest scale circuit structure.

In accordance with the above objects, the present invention is addressed to a specific information recording/reproduction apparatus. This apparatus has a first recording device for receiving a first electrical signal representing image information and recording the image information onto a dynamic recording medium of a given type. A non-dynamic or "static" recording medium is built in the apparatus. The static recording medium stores a second electrical signal digitally representing audio information accompanying image information. A second recording device, electrically connected to the static recording medium, determines a memory address of audio information accompanying image information in the static recording medium in such a manner that the address corresponds to the recording position of the image information in the dynamic recording medium, and records the audio information on the static recording medium in accordance with the determined memory address. The static recording medium includes a non-volatile semiconductor memory.

The present invention and its objects and advantages will become more apparent from a detailed description of preferred embodiments of the present invention presented below.

BRIEF DESCRIPTION OF THE DRAWINGS

In the detailed description of preferred embodiments of the present invention presented below, reference is made to the accompanying drawings of which:

FIG. 3 is a schematic block diagram illustrating the general structure of a modification of the image/audio information recording/reproduction apparatus shown in FIG. 1;

DETAILED DESCRIPTION OF THE PREFERRED EMBODIMENTS

Figure 1:
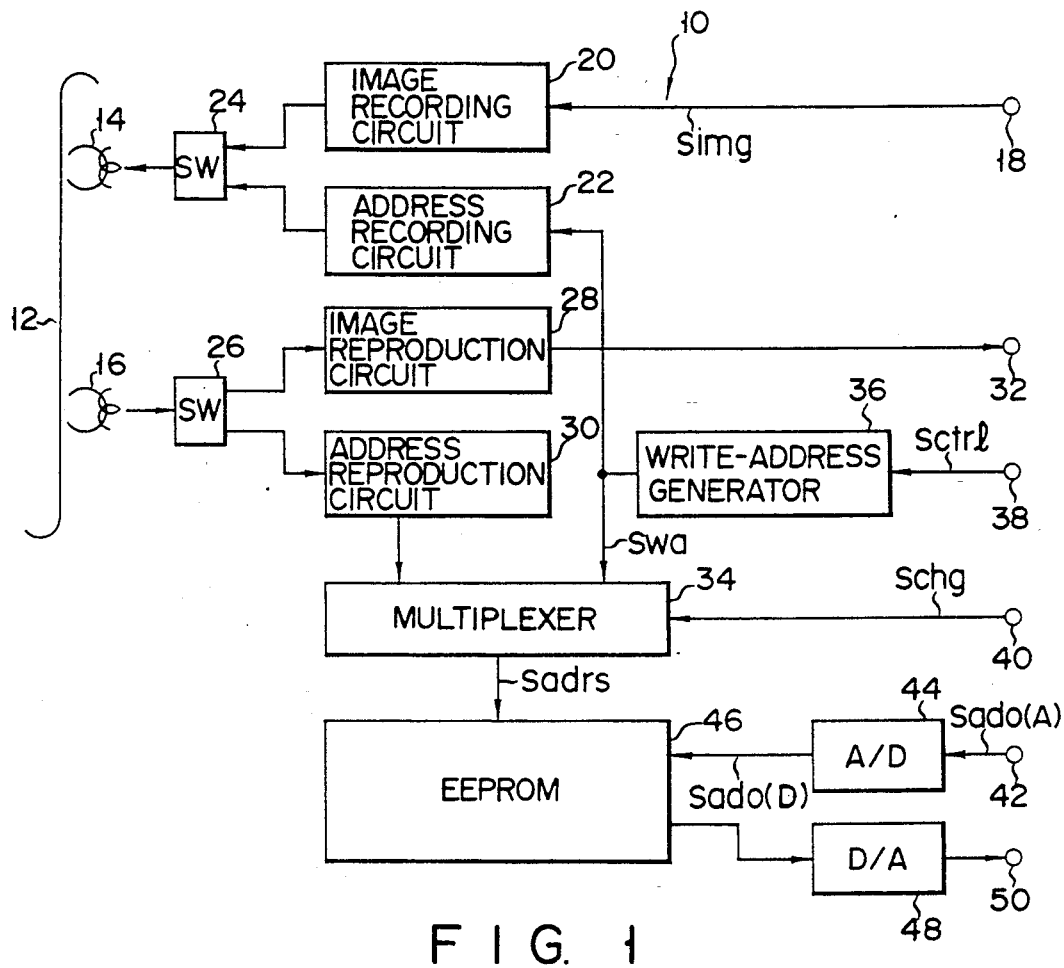
FIG. 1 is a block diagram schematically illustrating the general structure of an image/audio information recording/reproduction apparatus according to a preferred embodiment of the present invention.

Referring to FIG. 1, a video tape recording apparatus as an image/audio information recording/reproduction apparatus in accordance with one preferred embodiment of the present invention is generally designated by reference numeral "10." In the diagram, a magnetic tape 12 serving as a information recording medium is provided in a well-known manner so that it can run while being kept in contact with first and second magnetic heads 14 and 16 provided on a rotatable drum structure (not shown). The first magnetic head 14 is an information recording head for recording video information and its address signal on the magnetic tape 12. The second magnetic head 16 is a video reproduction head for playing back image information and its address signal recorded on the video tape 12.

An image signal Simg undergone digital processing is supplied from an image input terminal 18. An image recording circuit 20, connected to the input terminal 18, typically includes a preemphasis circuit, a frequency modulator and a signal amplifier (none of them shown), which are all well-known. The image recording circuit 20 converts an input image signal into an electrical signal which is magnetically recordable. An address recording circuit 22 produces a recording address signal of the image signal Simg. The output signals of those circuits 20 and 22 are supplied to a switch circuit 24, which is electrically connected to and associated with the recording head 14.

The reproduction head 16 plays back image information signal stored in the magnetic tape 12 in motion to produce an electrical image reproduction signal. This head 16 is connected to a switch circuit 26, which is connected to an image reproduction circuit 28 and an address reproduction circuit 30. The image reproduction circuit 28, typically including a deemphasis circuit, a frequency demodulator and a signal amplifier (none of them shown), which are all well-known, sends a reproduced image signal to an image output terminal 32.

The address recording circuit 22 and address reproduction circuit 30 are connected to a multiplexer 34. A write-address generating circuit 36 is connected to the address recording circuit 22 and multiplexer 34. The write-address generator 36 is responsive to a control signal Sctrl supplied from a control signal input terminal 38. The multiplexer 34 selects an output signal of the address reproduction circuit 30 and an output signal Swa of the write-address generator 36 in response to an address select signal Schg from an input terminal 40, and produces an address control signal Sadrs to manage the recording/reproduction address of an audio signal.

An analog audio information signal Sado(A), for example, a stereo sound effect signal, is supplied from an audio input terminal 42. An analog-to-digital (A/D) converter 44, connected to the audio input terminal 42, converts the analog audio signal Sado(A) into a digital audio signal Sado(D). The digitized audio signal Sado(D) is transferred to a non-volatile semiconductor memory section 46, which includes an electrically erasable programmable read only memory simply called "EEPROM." It is preferable that the EEPROM 46 is constituted of a NAND type, electrically erasable programmable read only memory simply called "NAND type EEPROM."

The EEPROM 46 is in principle devoted to storing a digital audio information signal; hereinafter, it is referred to as audio data storage section. Audio information (stereo sound effect signal in this embodiment) accompanying image information recorded on the magnetic tape 12 is subjected to digital processing by the A/D converter 44 and recorded or stored in the audio data storage section 46. It should be noted that writing of the audio information involves no magnetic head and is not at all based on the mechanical relative movement between the magnetic head and recording medium, unlike what is done in the conventional image information recording/reproduction apparatuses. In this sense, the audio data storage section 46 may be called "static audio data storage section."

The static audio data storage section 46 is installed removable to the body of the video tape recording apparatus 10. The section 46 is also connected to a digital-to-analog (D/A) converter 48. Audio information read out from the EEPROM of the static audio data storage section 46 is converted by the D/A converter 48 into the original analog audio signal which is sent to an audio output terminal 50.

Figure 2:
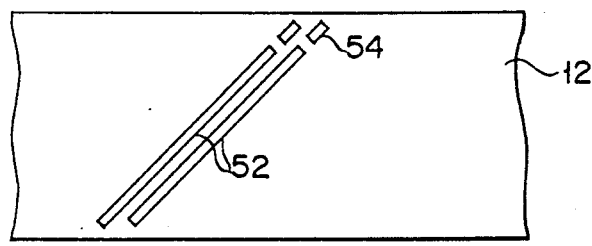
FIG. 2 is a plan view of information recording tracks magnetically defined on a magnetic tape used in the embodiment shown in FIG. 1.

The video tape recording apparatus 10 employs a well-known "helical scan recording system" for recording and reproducing analog image information. Accordingly, image information is magnetically recorded on inclined recording tracks 52 defined on the magnetic tape 12 in motion by the first magnetic head or recording head 14. As shown in FIG. 2, these tracks 52 are defined with an inclination to the running direction of the magnetic video tape 12.

More specifically, an image signal appearing at the input terminal 18 is converted into a video signal suitable for magnetic recording on the tape 12 by the image recording circuit 20. This video signal is supplied to the recording head 14 together with a video address signal produced by the address recording circuit 22. The recording head 14 records these signals on the running magnetic tape 12 in a well-known manner.

The analog audio information signal Sado(A) appearing at the input terminal 42 accompanies the image signal and chronologically corresponds thereto; considering the audio information signal as stereo sound effect information accompanying a frame image may help easily understand the signal. The audio information signal is supplied to the A/D converter 44, which converts it into a digital audio signal Sado(D) with a preselected sampling frequency and the proper number of quantization bits. The digital audio signal is synchronized with an associated image frame, and is written and stored at the proper memory address in the static audio data storage section (EEPROM) 46.

More specifically, in response to the control signal Sctrl, the write-address generator 36 produces a write address designation signal Swa to specify the storage position (memory address) of each piece of data of the digital audio signal Sado(D) in the memory space of the EEPROM 46. The audio memory address which is designated by the write address designation signal Swa can be set any time to the desired status by the control signal Sctrl. This signal Swa is sent to the multiplexer 34, which selects the received signal Swa at the proper timing and sends it as an address control signal Sadrs to the static audio data storage section (EEPROM) 46. The digital audio signal Sado(D) is therefore written in the EEPROM 46 at the memory address specified by the signal Swa.

The write address designation signal Swa produced by the write-address generator 36 is also supplied to the address recording circuit 22, and is then supplied together with the image information signal to the magnetic recording head 14 by means of the switch circuit 24. When an audio signal component is stored in the EEPROM 46 at the specified address, therefore, the same write address data is recorded by the recording head 14 on one of small inclined tracks 54 which make pairs with the associated image recording tracks 52. Each small inclined track 54$i$ is formed by the head 14 on the tape 12 so that it lies on a line extending from the associated image recording track 52$i$, as shown in FIG. 2. The small inclined tracks 54 will be hereinafter called "associated audio information memory address recording tracks" or "audio address recording tracks" for short. Audio information accompanying image information is recorded in the memory address region of the EEPROM 46 determined by the address data recorded on an additional audio address recording track 54$i$ on the magnetic tape 12, which is linearly aligned with the track 52$i$ having the image information recorded thereon, thus permitting time-associated recording of image information and audio information accompanying the former information. With the use of the audio address recording tracks 54, the memory address of audio information accompanying image information, stored on an image recording track 52, in the EEPROM 46 can be simply and accurately specified irrespective of how the audio information is distributed in the memory space of the EEPROM 46.

Image information accompanied with audio information is reproduced in the following manner. The magnetic recording head 14 is rendered inoperative in reproduction mode of the video tape recording apparatus 10, while the reproduction head 16 is rendered operative. The reproduction head 16 provided on the rotatable drum (not shown) sequentially traces the image recording tracks 52 on the magnetic tape 12 to magnetically reproduce image information. At the same time, the reproduction head 16 traces the audio address recording tracks 54 affixed to the normal recording tracks 52 to sequentially reproduce address data therefrom.

The reproduced image information signal and address data are routed and sent to the image reproduction circuit 28 and address reproduction circuit 30, respectively, by the switch circuit 26. The reproduced image signal is then sent as it is to the output terminal 32. With a well-known monitor display unit (not shown) connected to this output terminal 32, the reproduced image information would be displayed on the display screen.

The reproduced address data is supplied to the multiplexer 34 from the address reproduction circuit 30. The multiplexer 34 selects the reproduced address data at the proper timing in response to the select signal Schg and sends an address control signal Sadrs reflecting the received address data to the static audio data storage section (EEPROM) 46. In response to the address control signal Sadrs, the storage section (EEPROM) 46 conducts random access to the memory address space specified by this signal to read out audio information signal, accompanying the image information currently being reproduced from the magnetic tape 12, from the EEPROM. The read-out audio information signals are sequentially transferred in real time to the D/A converter 48 for conversion to analog audio information signals, which are in turn supplied to the output terminal 50. With a well-known power amplifier (not shown) and loudspeaker unit (not shown) connected to this output terminal 50, the reproduced audio information would be generated as audible sound from the loudspeaker unit.

In the above-described image/audio reproduction, each address data is sent via the multiplexer 34 to the EEPROM 46 from the address reproduction circuit 30 before the image information component magnetically read out from the associated image recording track 52$i$ is actually reproduced from the image reproduction circuit 28 electrically. Accordingly, the audio information accompanying image information can successfully be reproduced in synchronism with reproduction of the image information without a risk of causing any time delay. The timing between image reproduction and reproduction of the audio information accompanying the image information can be taken by controlling the timing of reading information from the EEPROM 46 or the rate of signal transfer between the EEPROM 46 and D/A converter 48.

According to this embodiment, audio information accompanying image information is stored directly in a digital form in a non-volatile semiconductor memory, such as an EEPROM, not on the magnetic tape 12. The conventional dynamic magnetic recording mechanism in any form is involved to record audio information. Naturally, it is unnecessary to convert an electrical audio information signal into a magnetic signal, nor is the recording quality of the audio information signal degraded due to a possible defect of the magnetic tape or possible deterioration of the tape's characteristic. It is also unnecessary to provide an additional circuitry such as an error correction circuit and error compensation circuit for compensating for degradation of reproduced information. It is therefore possible to simplify the general circuit structure of the image/audio information recording/reproduction apparatus while improving its operational reliability. This contributes to making the high-performance image/audio information recording/reproduction apparatus compact and reduces the manufacturing cost, which is good news for machine manufacturers.

The embodiment in FIG. 1 may be modified as illustrated in FIG. 3, wherein the EEPROM 46 of the static audio data storage section is associated with a data compression circuit 100 and a data expansion circuit 102. The former circuit 100, connected to the audio input terminal 42, converts an analog audio signal Sado(A) into a digital audio signal Sado(D) and compresses the latter signal Sado(D) by a predetermined data compression rate (bit rate) to produce a compressed digital audio signal Sado(D)'. This signal Sado(D)' is stored in the EEPROM 46. The latter circuit 102 "expands" the compressed digital audio signal read out from the EEPROM 46 to a size having the normal number of bytes. The data expansion circuit 102 also executes D/A conversion to produce a normal analog reproduced audio signal, which is sent to the output terminal 50 as per the previous embodiment. With such an arrangement, a greater amount of audio information signals can actually recorded in a digital form using the EEPROM 46 having a limited data storage capacity.

Figure 4:
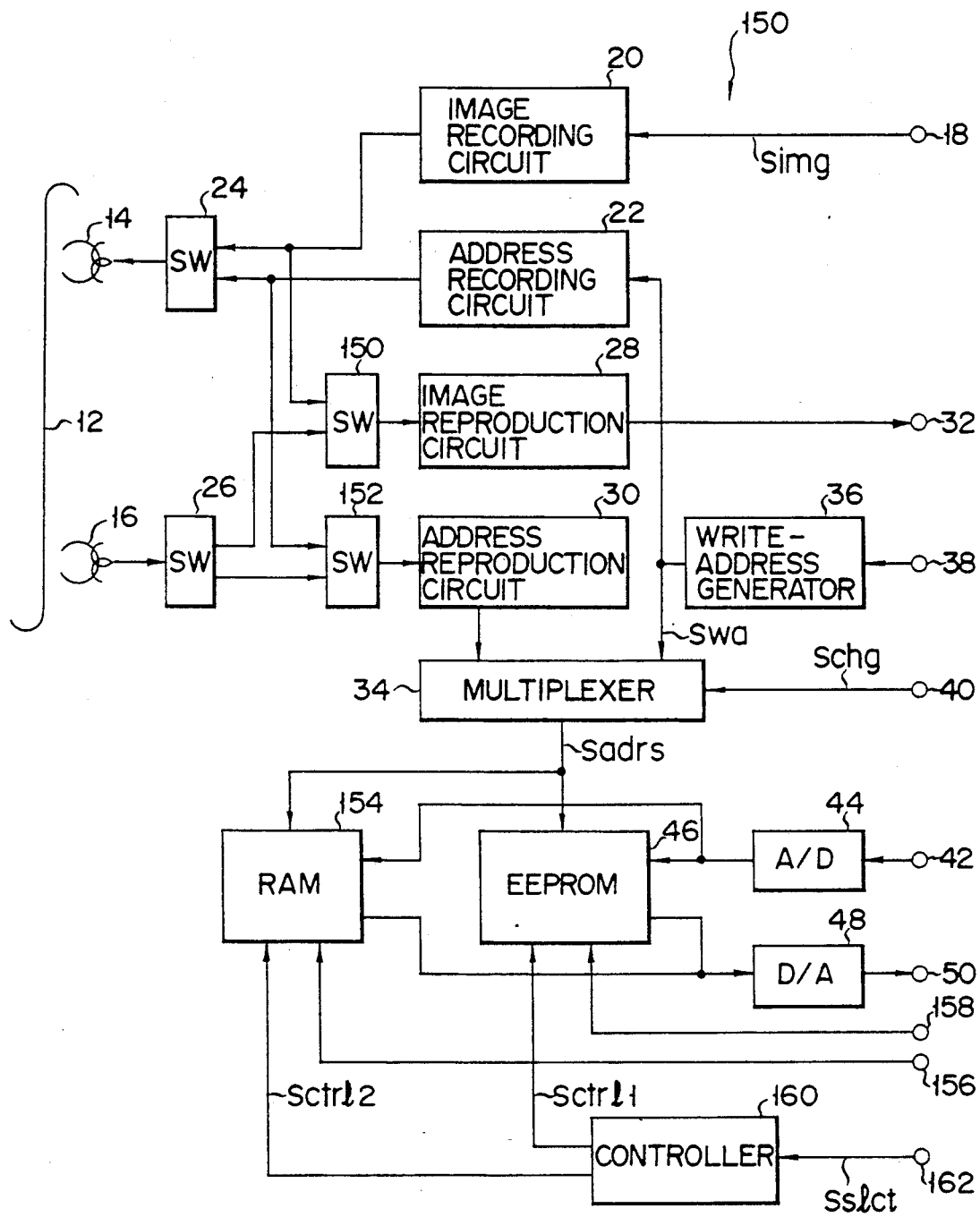
FIG. 4 is a block diagram schematically illustrating the general structure of an image/audio information recording/reproduction apparatus according to another preferred embodiment of the present invention.

Turning now to FIG. 4, a video tape recording apparatus or an image/audio information recording/reproduction apparatus according to another embodiment of the present invention is generally designated by reference numeral "150." This video tape recording apparatus has an extra built-in circuitry which permits monitoring or reproduction of image information accompanied with audio information without the actual use of the main record/reproduction circuit section of the apparatus. Like reference numerals are used in FIG. 4 to denote like elements of the embodiment shown in FIG. 1, thus omitting their otherwise redundant description.

Additional switch circuits 150 and 152 are provided in such a manner that the switch circuit 150 is connected between the switch circuit 24 and image reproduction circuit 28, while the other circuit 152 is connected between the switch circuit 26 and address reproduction circuit 30. The switch circuits 150 and 152 can allow the image information and its address data, currently being recorded on the magnetic tape 12 by the recording head 14, to be simultaneously transferred to the reproduction circuits 28 and 30.

The outputs of the multiplexer 34 and A/D converter 44 are directly connected to a semiconductor memory 154, such as a random-access memory (RAM), which is additionally provided Data read out from the RAM 154 is directly sent to the D/A converter 48. The RAM 154 is connected to an FE terminal 156 and is set to a data write enable status in response to a write-enable control signal that is supplied from the terminal 156. The EEPROM 46 is connected to an REC terminal 158. The EEPROM 46 also receives a write-enable control signal through this terminal and is set to a write enable status in response to the received control signal. In other words, the EEPROM 46 and the RAM 154 can be selectively set in the write-ready condition. The RAM 154 temporarily stores a digital audio information signal accompanying image information.

A control circuit 160 is connected to the EEPROM 46 and RAM 154. The controller 160 sends control signals Sctrl1 and Sctrl2 to the EEPROM 46 and RAM 154 in response to an output select signal Sslct from a control input terminal 162. The EEPROM 46 is selectively set in read-enable condition in response to the signal Sctrl1, whereas the RAM 154 is selectively set in read enable condition in response to the signal Sctrl2.

When an operation monitoring mode is specified, the digital audio signal produced by the A/D converter 44 is sent to the RAM 154, written therein, and read therefrom. The write/read address for the signal is determined in accordance with the address control signal Sadrs from the multiplexer 34.

An image signal is supplied, after it is generated by the image recording circuit 20, to the image reproduction circuit 28 via the additional switch circuit 150 and is immediately reproduced by the circuit 28; the reproduced signal is then transferred to the image output terminal 32. Address data of the image information is sent from the address recording circuit 22 to the address reproduction circuit 30, and further to the multiplexer 34. The RAM 154 permits reading of a digital audio signal accompanying the image information in accordance with this address data and sends the audio signal to the D/A converter 48. At this time, since the data reading from the EEPROM 46 is inhibited by the controller 160, only the input data signal read out from the RAM 154 is supplied to the D/A converter 48. This permits an operator or user to monitor in real time image information and audio information accompanying the former information, while verifying the present operating condition of the apparatus.

Figure 5:
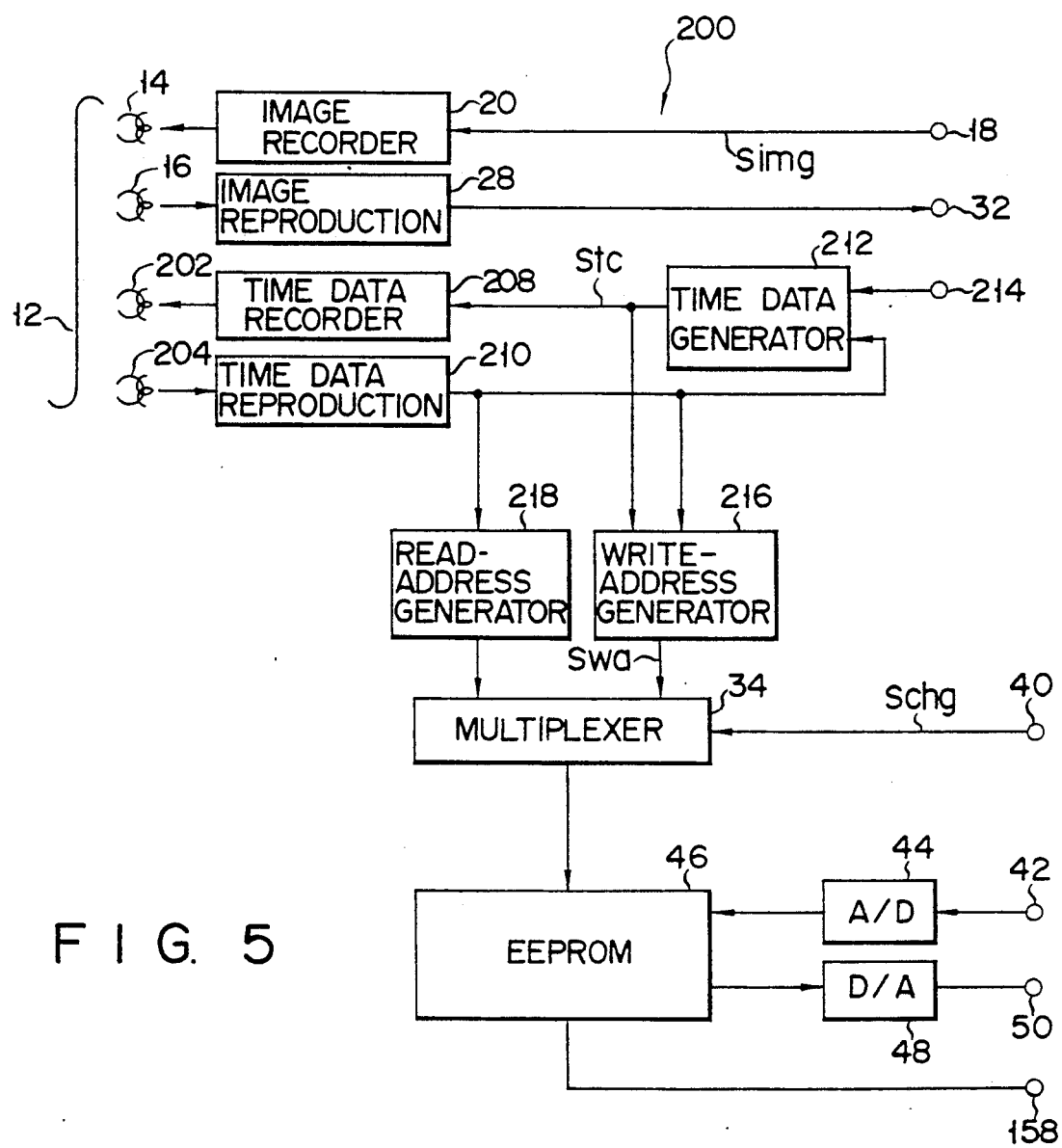
FIG. 5 is a schematic block diagram showing the general structure of an image/audio information recording/reproduction apparatus according to a further preferred embodiment of the present invention.

Turning to FIG. 5, a video tape recording apparatus or an image/audio information recording/reproduction apparatus according to a further embodiment of the present invention is generally designated by reference numeral "200." This video tape recording apparatus is designed to control the write address in the EEPROM 46 of an audio information signal accompanying image information presently being recorded, based on time data. Like reference numerals are used in FIG. 5 to denote like elements of the above-described embodiments, thus omitting their otherwise redundant description.

Figure 6:
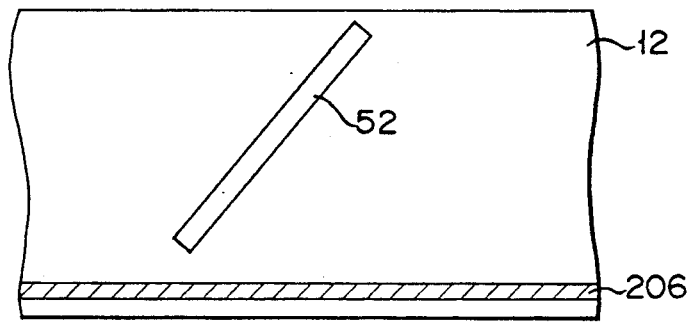
FIG. 6 is a plan view of information recording tracks magnetically defined on a magnetic tape used in the embodiment shown in FIG. 5.

This embodiment apparatus has a recording head 202 for magnetically recording time data on the magnetic tape 12 and a reproduction head 204 for reproducing the time data from the magnetic tape 12, in addition to the above-described recording and reproduction heads 14 and 16. These additional two heads 202 and 204 are fixed magnetic heads which trace recording tracks in such a way as to maintain a constant position to one edge of the running magnetic tape 12 along the length thereof. The stationary recording head 202 defines a single independent recording track 206 on the magnetic tape 12, as shown in FIG. 6. Since time data is recorded on this recording track 206, the track is also called "time data recording track." The fixed reproduction head 204 traces the time data recording track 206 to reproduce the time data.

As shown in FIG. 5, the fixed recording head 202 is associated with a time data recorder 208, and the fixed reproduction head 204 with a time data reproduction circuit 210. A time data generator 212 is connected to a terminal 214, the time data recorder 208 and time data reproduction circuit 210. In response to a time control signal from the terminal 214, the time data generator 212 manages the timing at which recording of image information starts and counts the actual recording time elapsed from the start of the recording in real time to produce a time counter signal Stc. The time counter signal Stc includes frame data of image information in addition to time, minute and second data. In the case of recording new information onto the magnetic tape 12 in a continuation manner that the starting storage position of it follows the last storage position of the information being presently recorded thereon, the time data generator 212 generates a new time count signal Stc which causes the time counting to be continued from the last time count value of the information to be reproduced by the time data reproduction circuit 210. The time counter signal Stc is sent as the aforementioned time data to the time data recorder 208. The signal Stc is then modified to a magnetically recordable form by the recorder 208 and is recorded on the track 206 (see FIG. 6) on the magnetic tape 12 in motion by the fixed head 202.

The time data signal Stc is also supplied to a write-address generator 216. Based on the signal Stc, the write-address generator 216 produces an address signal Swa representing the memory address in the EEPROM 46 of an audio information signal which accompanies image information presently being recorded and chronologically coincides with this information. The address signal Swa is supplied to the multiplexer 34.

The multiplexer 34 sends the address signal Swa to the EEPROM 46 in response to the select signal Schg. The EEPROM 46 then stores the digital audio information signal from the A/D converter 4 in the specified address region in a form chronologically accurately corresponding to the image information signal Simg presently being recorded.

In reproduction mode, the fixed head 204 magnetically picks up time data recorded on the track 206 on the magnetic tape 12. The time data reproduction circuit 210 reproduces this time data. An electrical signal representing the reproduced time data is supplied to a read-address generator 218 as well as fed back to the time data generator 212. In response to the time data, the read-address generator 218 produces an address designation signal to specify the corresponding address region in the EEPROM 46. This signal is supplied to the multiplexer 34, which in turn sends the address designation signal to the EEPROM 46. As a result, the audio information signal chronologically corresponding to the image information presently being reproduced is immediately read out from the EEPROM 46 and is converted into an analog signal by the D/A converter 48.

With such an arrangement, audio information accompanying image information to be recorded is given chronological correspondence with the latter information and is stored in the EEPROM 46, which can completely prevent a time delay between image information and audio information at the time of recording/reproducing a video signal.

The write address generator 216 may be arranged so that the write address signal Swa is created on the basis of the time data of reproduced image information when it is required that the time data of information being presently recorded on the magnetic tape 12 is prevented from being over-written and replaced by that of new information to be recorded, for example, when the "after-recording" is to be executed wherein only the audio information is recorded while the image information is kept unchanged.

What is claimed is:

1. An apparatus for recording image information accompanied with audio information, comprising:
    first recorder means for receiving a first electrical signal representing image information and for recording the image information on a preselected type of dynamic recording medium;
    a preselected type of static recording medium for storing a second electrical signal which digitally represents audio information accompanying the image information; and
    second recorder means, coupled to said static recording medium and said dynamic recording medium, for recording on said dynamic recording medium a management data specifying a storage address of the second signal in said static recording medium in a manner corresponding to a recording position of said image information on said dynamic recording medium, and for managing a relationship between a recording address of the image information on said dynamic recording medium and the storage address of the audio information accompanying said image information using said management data.

2. The apparatus according to claim 1, wherein said static recording medium comprises a non-volatile solid-state memory.

3. The apparatus according to claim 2, wherein said non-volatile solid-state memory includes a programmable semiconductor memory.

4. The apparatus according to claim 1, wherein said second recorder means comprises recording head means for recording said management data together with said image information on said dynamic recording medium.

5. The apparatus according to claim 1, further comprising:
    compress means, connected to a semiconductor memory, for electrically compressing said second electrical signal and producing a compressed digital audio signal, said compressed digital audio signal being stored in said semiconductor memory.

6. An information apparatus comprising:
    image recorder means for receiving an electrical signal representing image information to be recorded, and for recording the image information on a recording medium in motion;
    a built-in information recording unit having a non-volatile semiconductor memory;
    audio information recorder means, connected to said built-in information recording unit, for receiving an electrical digital audio signal representing audio information accompanying said image information, and for storing in said semiconductor memory digital audio information corresponding to an image information component recorded on said recording medium; and
    address manager means, connected to said image recorder means and said audio information recorder means, for recording on said recording medium a data specifying a storage address of said semiconductor memory at which the digital audio information accompanying said image information component is stored while said information component is being recorded on said recording medium, for managing, using said data, a relation between a recording position of said image information component on said recording medium and the storage address of digital audio information in said semiconductor memory, which corresponds to said recording position, and for supplying said storage address to said audio information recorder means.

7. The apparatus according to claim 5, further comprising:
    image reproduction means for dynamically playing back image information recorded on said recording medium, and for producing an electrical image reproduction signal representing said reproduced image information; and
    audio information reproduction means, connected to said built-in information recording unit, for reading audio information accompanying said reproduced image information from said semiconductor memory under the control of said address manager means, and for producing an electrical digital audio reproduction signal representing said read-out audio information.

8. The apparatus according to claim 7, wherein said built-in information recording unit is removable.

9. The apparatus according to claim 7, further comprising:
    data compression means, connected to said built-in information recording unit and said audio information recorder means, for compressing said digital audio information, and for supplying compressed digital audio information having a reduced amount of data to said built-in information recording unit; and data expansion means, connected to said built-in information recording unit and said audio information reproduction means, for expanding compressed digital audio information read out from said semiconductor memory to produce expanded digital audio reproduction information having a normal amount of data.

10. The apparatus according to claim 9, wherein said recording medium includes a magnetic recording medium.

11. The apparatus according to claim 10, wherein said semiconductor memory includes an electrically rewritable programmable read only memory.

12. The apparatus according to claim 6, further comprising:

data compression means, connected to said built-in information recording unit and said audio information recorder means, for compressing said digital audio information and for supplying compressed digital audio information having a reduced amount of data to said built-in information recording unit.

13. The apparatus according to claim 12, wherein said recording medium includes a magnetic recording medium.

14. An information reproduction apparatus comprising:

image reproduction means for dynamically reproducing image information recorded on a recording medium and for producing an electrical image reproduction signal representing said reproduced image information;

built-in information storage means for electrically storing digital audio information accompanying said image information, said information storage means having a non-volatile semiconductor memory;

address manager means, connected to said image reproduction means and said information storage means, for reproducing means and said information storage means, for reproducing a data specifying a storage address of said semiconductor memory at which the digital audio information is stored while said image information is being reproduced from said recording medium, for managing, using said data, a relation between a recording position of said image information on said recording medium and the storage address of digital audio information in said semiconductor memory, which corresponds to said recording position, and for producing an address specifying signal; and audio information reproduction means, connected to said built-in information storage means and said address manager means, for reading out audio information accompanying said reproduced image information in response to said address specifying signal, and for producing an electrical digital audio reproduction signal representing said read-out audio information.

15. The apparatus according to claim 14, wherein said semiconductor memory stores image information in a compressed form.

16. The apparatus according to claim 15, further comprising:

data expansion means, connected to said built-in information storage means and said audio information reproduction means, for expanding compressed digital audio information read out from said semiconductor memory to produce expanded digital audio reproduction information having a normal amount of data.

17. The apparatus according to claim 16, wherein said recording medium includes a magnetic recording medium.

18. The apparatus according to claim 16, wherein said semiconductor memory includes an electrically rewritable programmable read only memory.

* * * * *